United States Patent
Mhaske et al.

(10) Patent No.: US 11,606,689 B1
(45) Date of Patent: Mar. 14, 2023

(54) SYSTEMS AND METHODS FOR AUTHENTICATING APPLICATION POINTS OF ENTRY TO PREVENT UNAUTHORIZED USE OF LOCKED MOBILE APPLICATIONS

(71) Applicant: NORTONLIFELOCK INC., Tempe, AZ (US)

(72) Inventors: Sharad Mhaske, Maharashtra (IN); Anand Darak, Maharashtra (IN)

(73) Assignee: Gen Digital Inc., Tempe, AZ (US)

(*) Notice: Subject to any disclaimer, the term of this patent is extended or adjusted under 35 U.S.C. 154(b) by 196 days.

(21) Appl. No.: 17/112,277

(22) Filed: Dec. 4, 2020

(51) Int. Cl.
| | |
|---|---|
| *G06F 7/04* | (2006.01) |
| *H04N 7/16* | (2011.01) |
| *H04W 12/06* | (2021.01) |
| *H04W 12/02* | (2009.01) |
| *H04W 12/08* | (2021.01) |
| *H04W 12/122* | (2021.01) |

(52) U.S. Cl.
CPC ......... *H04W 12/068* (2021.01); *H04W 12/02* (2013.01); *H04W 12/08* (2013.01); *H04W 12/122* (2021.01)

(58) Field of Classification Search
CPC .... H04W 12/068; H04W 12/02; H04W 12/08
USPC .......................................................... 726/26
See application file for complete search history.

(56) References Cited

U.S. PATENT DOCUMENTS

2013/0078949 A1* 3/2013 Pecen .................. H04W 12/37 455/411
2018/0332033 A1* 11/2018 Lakhani ................. G06F 21/35

* cited by examiner

*Primary Examiner* — Jeffrey C Pwu
*Assistant Examiner* — Samuel Ambaye
(74) *Attorney, Agent, or Firm* — Greenberg Traurig, LLP

(57) ABSTRACT

The disclosed computer-implemented method for authenticating application points of entry to prevent unauthorized use of locked mobile applications may include (i) identifying one or more mobile applications having an access restriction and a group of application entry points associated with at least one mobile application function, (ii) intercepting a series of device inputs from a user for accessing the application entry points to bypass the access restriction for the mobile applications, (iii) requesting authentication credentials to bypass the access restriction from the application entry points, (iv) determining that the requested authentication credentials are invalid, and (v) performing a security action that protects against potentially malicious activity associated with unauthorized access to the mobile applications upon determining that the requested authentication credentials are invalid. Various other methods, systems, and computer-readable media are also disclosed.

20 Claims, 7 Drawing Sheets

SYSTEMS AND METHODS FOR AUTHENTICATING APPLICATION POINTS OF ENTRY TO PREVENT UNAUTHORIZED USE OF LOCKED MOBILE APPLICATIONS

BACKGROUND

In many enterprise and consumer environments, users of computing devices (e.g., mobile computing devices) may wish to restrict (i.e., lock) certain applications for preventing unintended access to application content or functionality by other users. For example, an owner or primary user of a mobile device may lock a messaging application prior to sharing their device with a friend so as to prevent the reading of personal messaging content and/or unauthorized use of the messaging application to send/reply to messages on the user's behalf.

Traditional solutions for locking mobile applications utilize mechanisms that prevent direct application access (e.g., preventing the launching of an application from a mobile device main/home user interface screen). However, these same mechanisms often fail to prevent access to locked mobile applications via alternative entry points from which a user may launch or engage with application specific content such as responding to messaging application notifications, accessing application shortcuts, and/or performing other application actions, thereby potentially compromising user privacy and mobile device security.

SUMMARY

As will be described in greater detail below, the present disclosure describes various systems and methods for authenticating application points of entry to prevent unauthorized use of locked mobile applications.

In one example, a method for authenticating application points of entry to prevent unauthorized use of locked mobile applications may include (i) identifying, by one or more computing devices, one or more mobile applications having an access restriction and a group of application entry points associated with at least one mobile application function, (ii) intercepting, by the one or more computing devices, a series of device inputs from a user for accessing the application entry points to bypass the access restriction for the mobile applications, (iii) requesting, by the one or more computing devices, authentication credentials to bypass the access restriction from the application entry points, (iv) determining, by the one or more computing devices, that the requested authentication credentials are invalid, and (v) performing, by the one or more computing devices, a security action that protects against potentially malicious activity associated with unauthorized access to the mobile applications upon determining that the requested authentication credentials are invalid.

In some examples, the mobile applications may be identified by (i) accessing a mobile device manager list comprising a set of restricted mobile applications; and (ii) selecting a subset of the restricted mobile applications from the mobile device manager list. In some embodiments, the subset of the restricted mobile applications may include a group of frequently used restricted mobile applications from the mobile device manager list. Additionally or alternatively, the subset of the restricted mobile applications may include mobile applications selected by a user from the mobile device manager list.

In some examples, intercepting the series of device inputs for accessing application entry points that bypass the access restriction to the mobile applications may generating a transparent window over a user interface displayed by the computing devices to capture the device inputs. In some embodiments, the series of device inputs may include one or more user clicks in a user interface notification window generated by the restricted mobile applications. Additionally or alternatively, the series of device inputs may include one or more user clicks to access a shortcut menu listing actions for performing functions associated with the restricted mobile applications.

In some examples, the authentication credentials for bypassing the access restriction to the mobile applications may be requested by (i) identifying an authentication method associated with the mobile applications for receiving the authentication credentials and (ii) requesting the authentication credentials based on the authentication method.

In some examples, the security action that protects against potentially malicious activity associated with unauthorized access to the mobile applications may include preventing execution of unauthorized application actions from the application entry points to the mobile applications. Additionally or alternatively, the security action may include preventing a mobile device application launcher from initiating a startup of the mobile applications from the application entry points In one embodiment, a system for authenticating application points of entry to prevent unauthorized use of locked mobile applications may include at least one physical processor and physical memory that includes computer-executable instructions and one or more modules that, when executed by the physical processor, cause the physical processor to (i) identify, by an identification module, one or more mobile applications having an access restriction and a group of application entry points associated with at least one mobile application function, (ii) intercept, by a capture module, a series of device inputs from a user for accessing the application entry points to bypass the access restriction for the mobile applications, (iii) request, by an authentication module, authentication credentials to bypass the access restriction from the application entry points, (iv) determine, by a determining module, that the requested authentication credentials are invalid, and (v) perform, by a security module, a security action that protects against potentially malicious activity associated with unauthorized access to the mobile applications upon determining that the requested authentication credentials are invalid.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify one or more mobile applications having an access restriction and a group of application entry points associated with at least one mobile application function, (ii) intercept a series of device inputs from a user for accessing the application entry points to bypass the access restriction for the mobile applications, (iii) request authentication credentials to bypass the access restriction from the application entry points (iv) determine that the requested authentication credentials are invalid, and (v) perform a security action that protects against potentially malicious activity associated with unauthorized access to the mobile applications upon determining that the requested authentication credentials are invalid.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
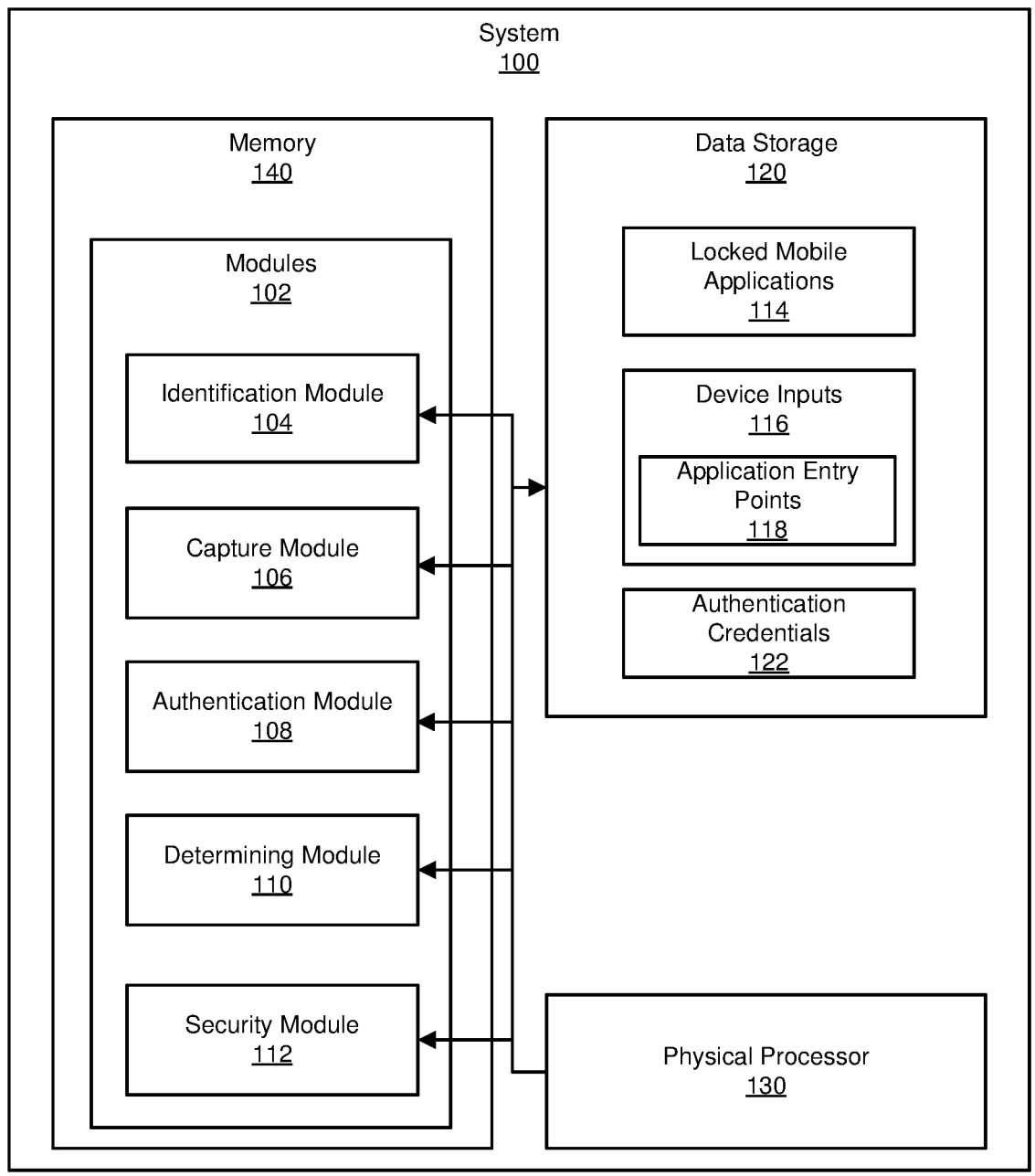
FIG. 1 is a block diagram of an example system for authenticating application points of entry to prevent unauthorized use of locked mobile applications.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for authenticating application points of entry to prevent unauthorized use of locked mobile applications. As will be explained in greater detail below, by generating a transparent window over a mobile device user interface (UI) to intercept user clicks received for entry points that bypass an application lock feature for mobile applications, the systems and methods described herein may prevent unintended access to locked mobile applications by requiring authentication (e.g., a password) prior to allowing the bypass. By providing for the authentication of click requests for accessing application entry points in this way, the systems and methods described herein may protect users from unintended access to locked mobile applications (and associated application data) that may result when sharing their mobile device with others.

In addition, the systems and methods described herein may improve the functioning of a computing device and/or the technical field of computer device security, by preventing potentially malicious activity that may compromise the operation of the computing device. For example, the systems and methods described herein may prevent the use of malicious auto clickers installed on a mobile computing device for accessing application entry points into locked mobile applications and further utilizing these applications for malicious purposes (e.g., downloading and installing malware designed to damage or disable the mobile device).

Figure 2:
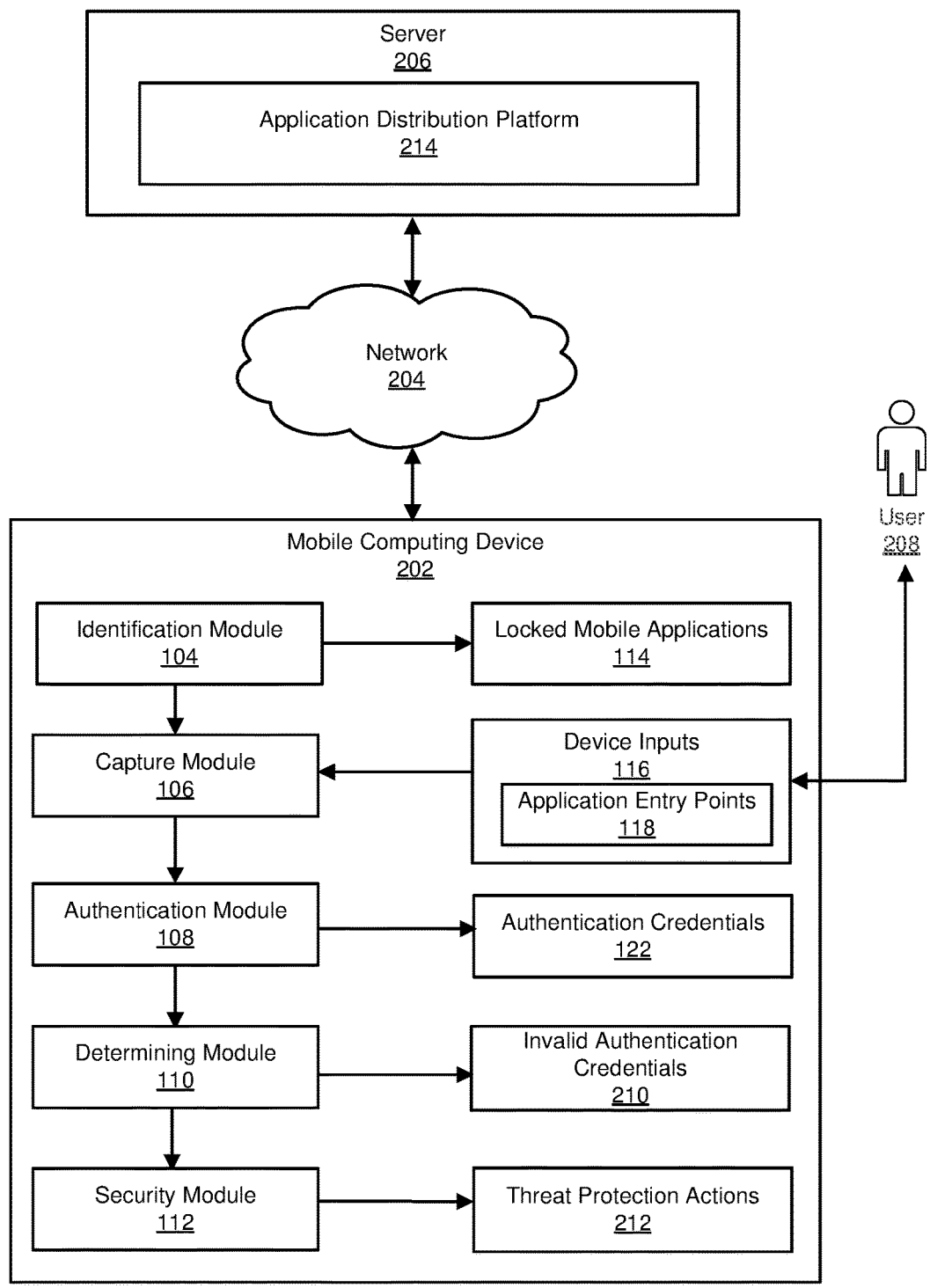
FIG. 2 is a block diagram of an additional example system for authenticating application points of entry to prevent unauthorized use of locked mobile applications.

The following will provide, with reference to FIGS. 1-2, detailed descriptions of example systems for authenticating application points of entry to prevent unauthorized use of locked mobile applications. Detailed descriptions of corresponding computer-implemented methods will also be provided in connection with FIG. 3. Additionally, a detailed description of an example user interface window that may be generated by the example system for authenticating application points of entry to prevent unauthorized use of locked mobile applications, will also be provided in connection with FIG. 4. Additionally, a detailed description of an example user interface that may be generated by the example system for authenticating application points of entry to prevent unauthorized use of locked mobile applications, will also be provided in connection with FIG. 5. In addition, detailed descriptions of an example computing system and network architecture capable of implementing one or more of the embodiments described herein will be provided in connection with FIGS. 6 and 7, respectively.

FIG. 1 is a block diagram of an example system 100 for authenticating application points of entry to prevent unauthorized use of locked mobile applications. As illustrated in this figure, example system 100 may include one or more modules 102 for performing one or more tasks. For example, and as will be explained in greater detail below, example system 100 may include an identification module 104 that identifies locked mobile applications 114 (e.g., mobile applications having an access restriction associated with at least one mobile application function). Example system 100 may additionally include a capture module 106 that intercepts device inputs 116 corresponding to application entry points 118 for bypassing the access restrictions associated with locked mobile applications 114. Example system 100 may also include an authentication module 108 that requests authentication credentials 122 to allow the bypass of the access restrictions for locked mobile applications 114 from application entry points 118. Example system 100 may additionally include a determining module 110 that determines if authentication credentials 122 are invalid. Example system 100 may also include a security module 112 that performs a security action that protects against potentially malicious activity associated with unauthorized access to locked mobile applications 114 upon determining that authentication credentials 122 are invalid. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202). One or more of modules 102 in FIG.

1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate authenticating application points of entry to prevent unauthorized use of locked mobile applications. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include a data storage 120 for storing data and/or applications. In one example, data storage 120 may store, on system 100, locked mobile applications 114, data associated with device inputs 116 corresponding to application entry points 118 (e.g., user clicks in a mobile device graphical user interface (GUI)), and authentication credentials 122.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system.

As will be described in greater detail below, one or more of modules 102 from FIG. 1 may, when executed by at least one processor of computing device 202 and/or server 206, enable computing device 202 and/or server 206 to authenticate application points of entry to prevent unauthorized use of locked mobile applications.

For example, identification module 104 may identify locked mobile applications 114 having an access restriction associated with at least one mobile application function (e.g., directly launching the application from a user interface generated by a mobile device operating system). Next, capture module 106 may intercept device inputs 116 from a user 208 for accessing application entry points 118 to bypass access restrictions for locked mobile applications 114. Then, authentication module 108 may request authentication credentials 122 to allow user 208 to bypass the access restrictions for locked mobile applications 114 using application entry points 118. Next, determining module 110 may determine invalid authentication credentials 210 based on receiving incorrect information in response to the previously requested authentication credentials 122. Finally, security module 112 may perform a security action that protects against potentially malicious activity associated with unauthorized access to locked mobile applications 114 upon the determination of invalid authentication credentials 210.

Computing device 202 generally represents any type or form of computing device capable of reading computer-executable instructions. For example, computing device 202 may include an endpoint device capable of running a mobile operating system (e.g., the ANDROID mobile operating system or the iOS mobile operating system) for managing various applications (including applications downloaded from application distribution platforms) that may be utilized by one or more users. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of reading computer-executable instructions. In one example, server 206 may be an application server hosting an application distribution platform 214 for distributing applications to computing device 202. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
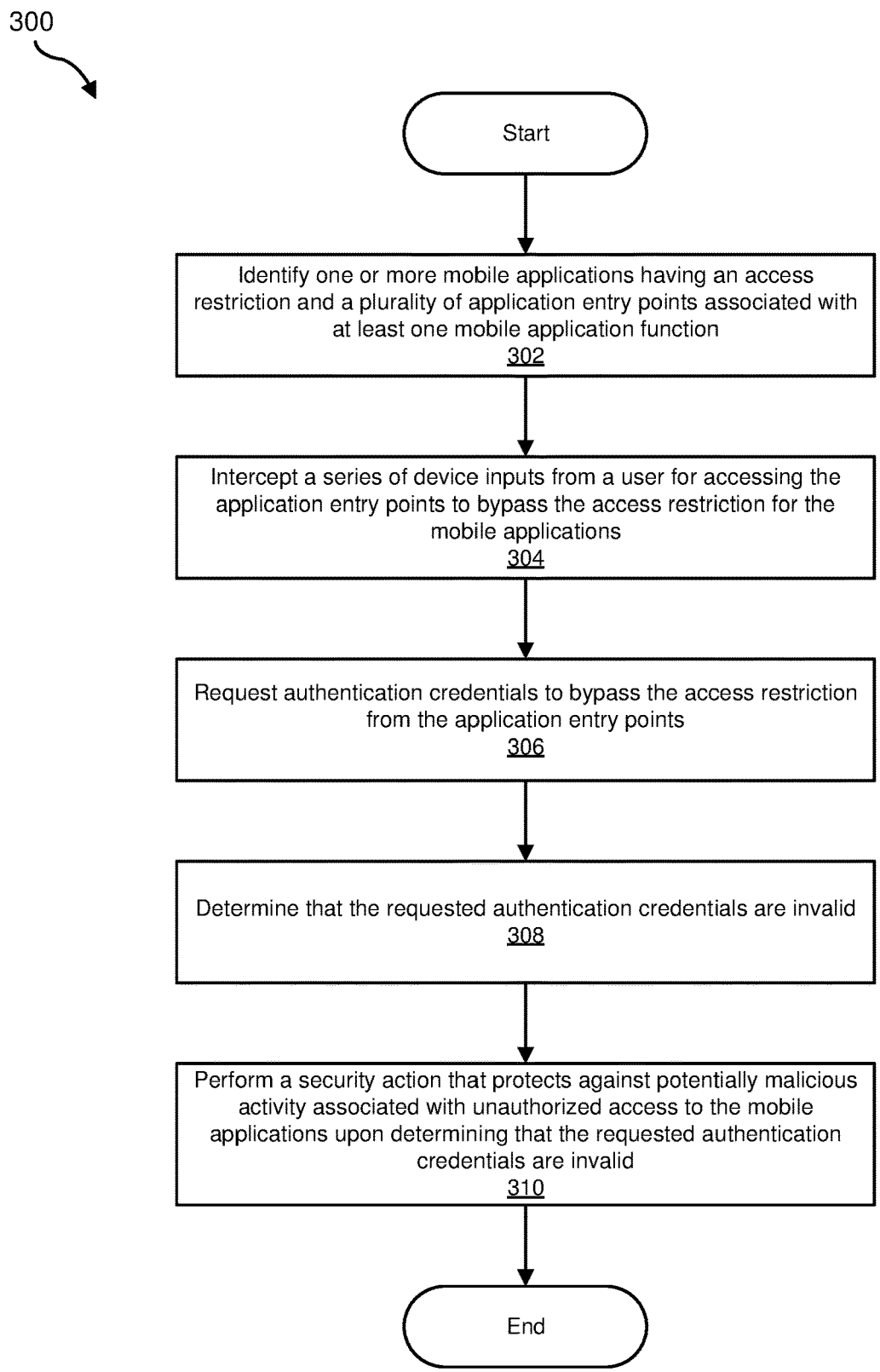
FIG. 3 is a flow diagram of an example method for authenticating application points of entry to prevent unauthorized use of locked mobile applications.

FIG. 3 is a flow diagram of an example computer-implemented method 300 for authenticating application points of entry to prevent unauthorized use of locked mobile applications. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may identify one or more mobile applications having an access restriction and a group of application entry points associated with at least one mobile application function. For example, identification module 104 may, as part of computing device 202 in FIG. 2, identify locked mobile applications 114 capable of being accessed (via device inputs 116) by application entry points 118 associated with performing any number of mobile application functions including, without limitation, launching, engaging, or entering content with respect to application notifications, application shortcuts, and/or application actions.

The term "locked mobile applications," as used herein, generally refers to any application capable of being utilized on a mobile computing device for which access to various application functions has been restricted by a mobile operating system. For example, a user of a mobile computing device may access a "Settings" option provided by the mobile operating system and select an option that restricts access to an e-mail or messaging application (so as to prevent these applications from being launched from a main UI screen on the mobile computing device) prior to a device handover to a guest user for viewing shareable content (e.g., video or photographs that include the guest user).

The term "application entry points," as used herein, generally refers to any access method on a mobile computing device capable of bypassing access restrictions associated with locked mobile applications. In some examples, access methods for locked mobile applications may include, without limitation, displayed application notifications that allow user input (e.g., performing read, reply, and/or other actions on incoming text messages, chats, or e-mails associated with messaging applications), shortcuts for launching and performing locked mobile application functions (e.g., launching or performing application functions for a locked mobile application by making a voice query to a mobile computing device virtual assistant, launching an application from an application distribution platform for a mobile device operating system to launch a locked mobile application, utilizing a "smart text selection feature" that presents a target application shortcut (e.g., to a locked mapping service application) following the selection of text in a source application (e.g., a selected address in a web browser application)), etc.

Identification module 104 may identify locked mobile applications 114 in a variety of ways. In one example, identification module 104 may access a mobile device manager application for a list of all locked mobile applications 114 on computing device 202 (e.g., via a mobile device accessibility service or a mobile device application usage manager). In some embodiments, each locked mobile application 114 may be identified by a unique identifier (ID) (e.g., a package name). In some embodiments, locked mobile applications 114 may represent a subset of a larger list of locked mobile applications on computing device 202 that have either been previously selected by a user or automatically selected by identification module 104 for the authentication of application entry points 118. For example, in one embodiment, identification module 104 may be configured to select the most used mobile applications in a given geographical region as locked mobile applications 114.

At step 304 one or more of the systems described herein may intercept a series of device inputs from a user for accessing the application entry points to bypass the access restriction for the mobile applications. For example, capture module 106 may, as part of computing device 202 in FIG. 2, intercept device inputs 116 from user 208 for accessing application entry points 118. In some examples, user 208 may be a guest user or other non-primary user of computing device 202 who is attempting to access a locked mobile application 114. In some examples, device inputs 116 may include one or more user clicks for accessing an application entry point 118 (e.g., one or more user clicks received in a UI notification window associated with a locked mobile application 114 or one or more user clicks for accessing shortcut menu listing actions for performing an application function associated with a locked mobile application 114).

Capture module 106 may intercept device inputs 116 in a variety of ways. In some embodiments, capture module 106 may initiate a call to an application programming interface (API) in communication with an operating system running on computing device 202 to generate a transparent window over a currently displayed UI for capturing user clicks for accessing application entry points 118 from user 208. For example, capture module 106 may call an API to generate a transparent window over a displayed notification UI dialog window that includes user options to read and/or reply to messages received by a locked messaging application, upon detecting one or more user clicks in the notification UI dialog window.

At step 306 one or more of the systems described herein may request authentication credentials to bypass the access restriction from the application entry points. For example, authentication module 108 may, as part of computing device 202 in FIG. 2, request authentication credentials 122 following the interception (i.e., capture) of device inputs 116 by capture module 106 as described above at step 304.

Authentication module 108 may request authentication credentials 122 in a variety of ways. In some embodiments, authentication module 108 may generate an authentication UI window for receiving credentials from user 208 following the interception of device inputs 116 intended to access application entry points 118 for a locked mobile application 114. In some embodiments, authentication module 108 may identify an authentication method associated with locked mobile applications 114 and request the authentication credentials 122 based on the authentication method. Example authentication methods may include, without limitation, passcodes, passwords, biometric inputs, pattern inputs, and/or gesture inputs set by a primary user of computing device 202 (e.g., the user selecting locked mobile applications 114 on computing device 202).

At step 308 one or more of the systems described herein may determine that the requested authentication credentials are invalid. For example, determining module 110 may, as part of computing device 202 in FIG. 2, determine authentication credentials 122 as invalid authentication credentials 210 when authentication credentials 122 fail to match predefined credentials selected by a primary user of computing device 202.

Determining module 110 may determine invalid authentication credentials 210 in a variety of ways. For example, determining module 110 may compare credentials received by authentication module 108 with previously stored credentials associated with locked mobile applications 114 by a primary user of computing device 202.

At step 312 one or more of the systems described herein may perform a security action that protects against potentially malicious activity associated with unauthorized access to the mobile applications upon determining that the requested authentication credentials are invalid. For example, security module 112 may, as part of computing device 202 in FIG. 2, perform one or more threat protection actions 212 upon determining module 110 determining invalid authentication credentials 210 at step 310.

Security module 112 may perform threat protection actions 212 in a variety of ways. In some examples, based on invalid authentication credentials 210, security module 112 may prevent the execution of application actions (e.g., replying to messages in a messaging application or launching mobile applications) from application entry points 118 that were intended to be prevented by a primary user of computing device 202 for locked mobile applications 114.

Figure 4:
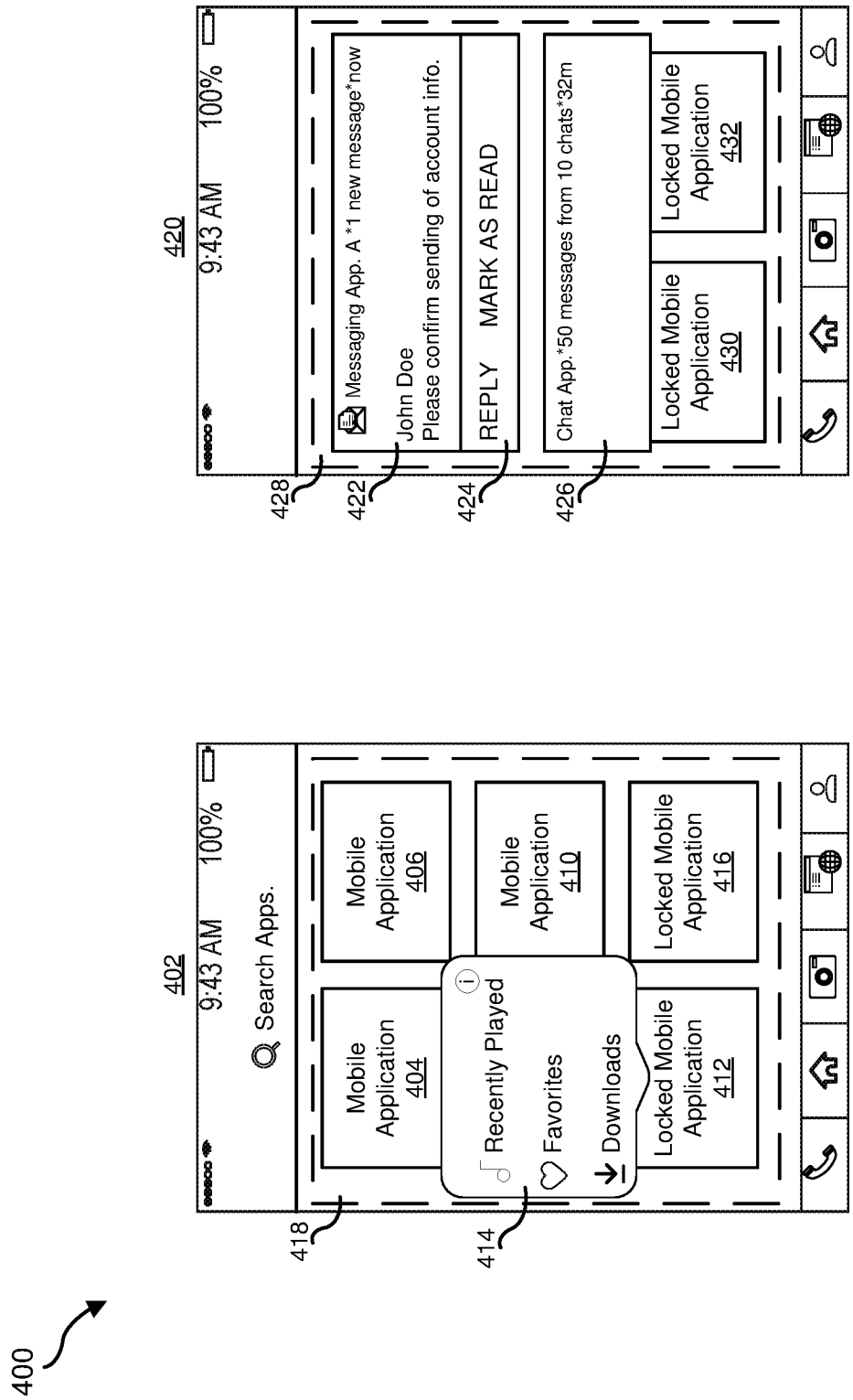
FIG. 4 is a block diagram of an example user interface window that may be generated by the example system for authenticating application points of entry to prevent unauthorized use of locked mobile applications.

FIG. 4 is a block diagram of example user interfaces 400 that may be generated by an example system for authenticating application points of entry to prevent unauthorized use of locked mobile applications. Example user interfaces 400 includes a UI display 402 for a mobile computing device. In some embodiments, UI display 402 may include mobile applications 404, 406, and 410 as well as locked mobile applications 412 and 416. UI display 402 also shows an application entry point for locked mobile application 412 (i.e., shortcut menu 414) displaying application functions associated with locked mobile application 412. As described above with respect to FIG. 3, transparent window 418 may be generated to intercept device inputs associated with the aforementioned application entry point into locked mobile application 412 for authentication.

Example user interfaces 400 also includes a UI display 420 for a mobile computing device. In some embodiments, UI display 420 may include locked mobile application 430. UI display 402 also shows application entry points for locked mobile applications 430 and 432 (i.e., messaging notification windows 422 and 426) that include options for responding to or reading messages. As described above with respect to FIG. 3, transparent window 428 may be generated to intercept device inputs associated with the aforementioned application entry points into locked mobile application 430 for authentication.

Figure 5:
FIG. 5 is a block diagram of an example user interface that may be generated by the example system for authenticating application points of entry to prevent unauthorized use of locked mobile applications.

FIG. 5 is a block diagram of an example UI 500 that may be generated by an example system for authenticating application points of entry to prevent unauthorized use of locked mobile applications. As shown in FIG. 5, UI 500 may include an authorization request window 502 and an authentication credentials field 504 (e.g., a password field). As described above with respect to FIG. 3, authorization request window 502 may be generated in response to one or more device inputs (i.e., user clicks) being received for accessing an application entry point for bypassing a locked mobile application. Once request window 502 has been generated, only a successful entry of authentication credentials in authentication credentials field 504 will enable a user to access an application point of entry into a locked mobile application for use of one or more application features.

As described in connection with method 300 above, the systems and methods described herein may authenticating application points of entry to prevent unauthorized use of locked mobile applications. In some examples, the systems described herein may include a threat protection application in communication with a mobile device operating system (such as the ANDROID or iOS mobile operating systems). The systems described herein may further be utilized to generate a transparent window over a mobile UI to intercept received user clicks for making entry points for applications configured as locked applications while leaving remaining mobile device functionality intact. The locked applications may be identified via unique ID assigned by an accessibility service or an application usage statistics manager (i.e., "usage stats manager") for the mobile device operating system. Upon intercepting the user clicks for making the application entry points, the systems described herein may require a requesting user to authenticate the click request, thereby protecting against other users potentially performing operations on locked applications (via application entry points) following mobile device user handovers.

Figure 6:
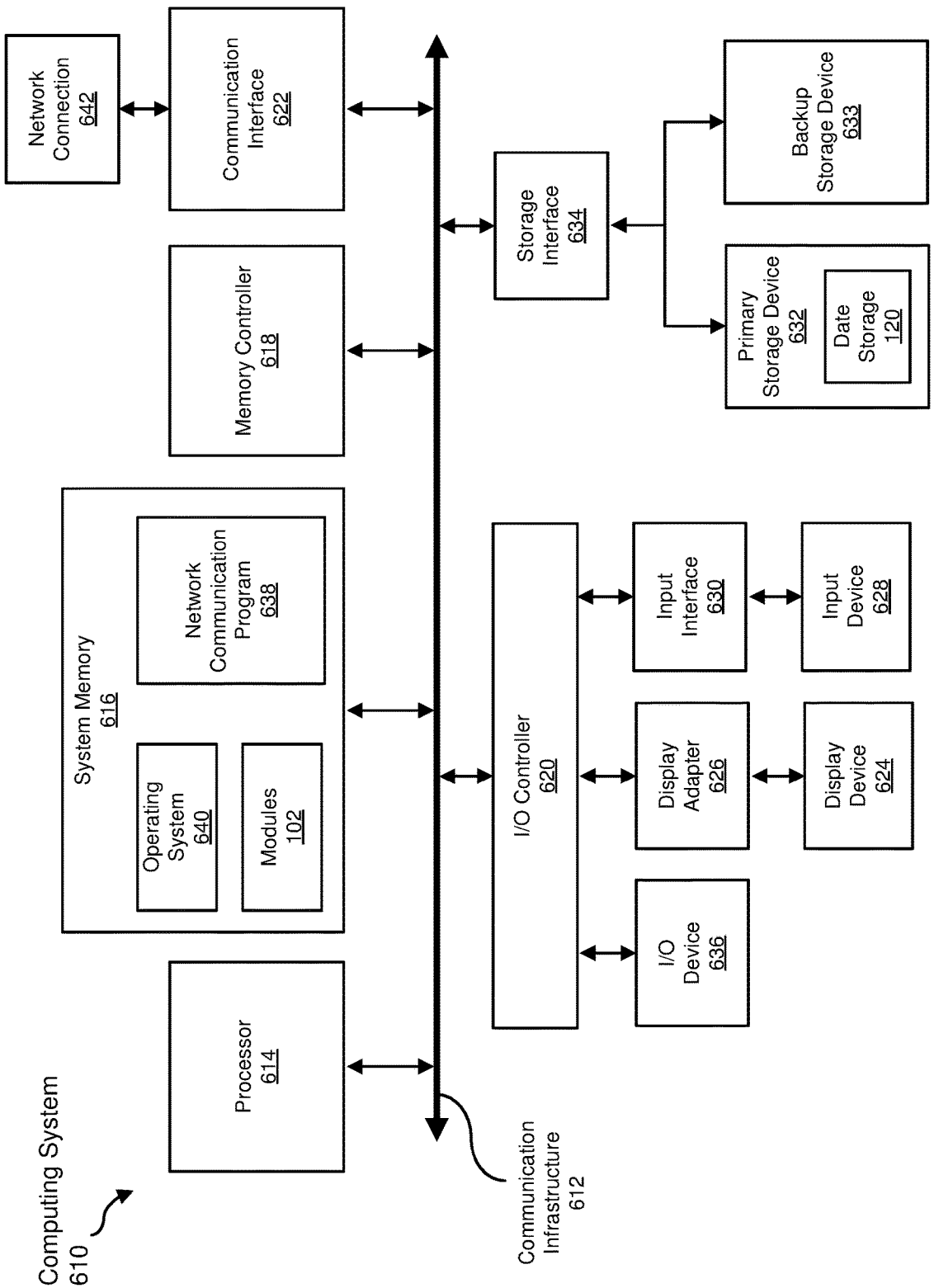
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, data storage 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
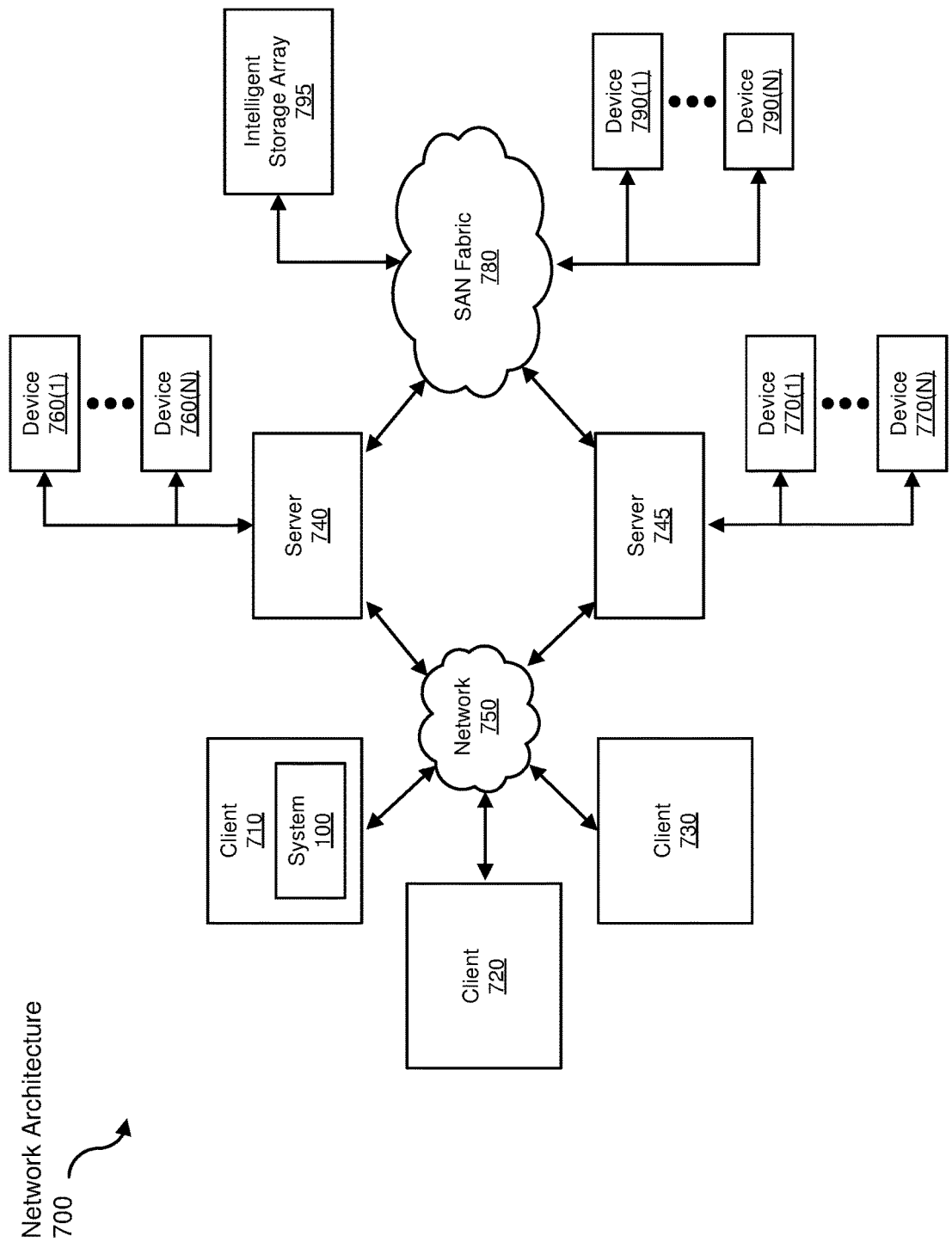
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the present disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for authenticating application points of entry to prevent unauthorized use of locked mobile applications.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for authenticating application points of entry to prevent unauthorized use of locked mobile applications, at least a portion of the method being performed by one or more computing devices comprising at least one processor, the method comprising:
   identifying, by the one or more computing devices, one or more mobile applications having an access restriction and a plurality of application entry points associated with at least one mobile application function;
   intercepting, by the one or more computing devices, a series of device inputs from a user for accessing the application entry points to bypass the access restriction for the mobile applications, wherein intercepting the series of device inputs comprises:
      initiating a call to an application programming interface (API) in communication with an operating system running on the one or more computing devices; and
      generating, in response to the API call, a transparent window over a currently displayed user interface displayed by the computing devices to capture the series of device inputs for accessing the application entry points from the user;
   requesting, by the one or more computing devices, authentication credentials to bypass the access restriction from the application entry points;
   determining, by the one or more computing devices, that the requested authentication credentials are invalid; and
   performing, by the one or more computing devices, a security action that protects against potentially malicious activity associated with unauthorized access to the mobile applications upon determining that the requested authentication credentials are invalid.

2. The computer-implemented method of claim 1, wherein identifying the mobile applications having the access restriction and the application entry points comprises:
   accessing a mobile device manager list comprising a set of restricted mobile applications; and
   selecting a subset of the restricted mobile applications from the mobile device manager list.

3. The computer-implemented method of claim 2, wherein selecting the subset of the restricted mobile applications from the mobile device manager list comprises selecting a plurality of frequently used restricted mobile applications from the mobile device manager list.

4. The computer-implemented method of claim 2, wherein selecting the subset of the restricted mobile applications from the mobile device manager list comprises receiving a user selection of the restricted mobile applications from the mobile device manager list.

5. The computer-implemented method of claim 1, wherein the series of device inputs for accessing the application entry points comprises one or more user clicks in a user interface notification window generated by the restricted mobile applications.

6. The computer-implemented method of claim 1, wherein the series of device inputs for accessing the application entry points comprises one or more user clicks to access a shortcut menu listing actions for performing functions associated with the restricted mobile applications.

7. The computer-implemented method of claim 1, wherein requesting the authentication credentials for bypassing the access restriction to the mobile applications comprises:
   identifying an authentication method associated with the mobile applications for receiving the authentication credentials; and
   requesting the authentication credentials based on the authentication method.

8. The computer-implemented method of claim 1, wherein performing the security action that protects against potentially malicious activity associated with unauthorized access to the mobile applications comprises preventing execution of unauthorized application actions from the application entry points to the mobile applications.

9. The computer-implemented method of claim 1, wherein performing the security action that protects against potentially malicious activity associated with unauthorized access to the mobile applications comprises preventing a mobile device application launcher from initiating a startup of the mobile applications from the application entry points.

10. A system for authenticating application points of entry to prevent unauthorized use of locked mobile applications, the system comprising:
   at least one physical processor;
   physical memory comprising computer-executable instructions and one or more modules that, when executed by the physical processor, cause the physical processor to:
      identify, by an identification module, one or more mobile applications having an access restriction and a plurality of application entry points associated with at least one mobile application function;
      intercept, by a capture module, a series of device inputs from a user for accessing the application entry points to bypass the access restriction for the mobile applications, wherein the capture module intercepts the series of device inputs by:
         initiating a call to an application programming interface (API) in communication with an operating system running on a computing device comprising the physical processor and the physical memory; and
         generating, in response to the API call, a transparent window over a currently displayed user interface displayed by the computing device to capture the series of device inputs for accessing the application entry points from the user;

request, by an authentication module, authentication credentials to bypass the access restriction from the application entry points;

determine, by a determining module, that the requested authentication credentials are invalid; and perform, by a security module, a security action that protects against potentially malicious activity associated with unauthorized access to the mobile applications upon determining that the requested authentication credentials are invalid.

11. The system of claim 10, wherein the identification module identifies the mobile applications having the access restriction and the application entry points by:

accessing a mobile device manager list comprising a set of restricted mobile applications; and selecting a subset of the restricted mobile applications from the mobile device manager list.

12. The system of claim 11, wherein the identification module selects the subset of the restricted mobile applications from the mobile device manager list by selecting a plurality of frequently used restricted mobile applications from the mobile device manager list.

13. The system of claim 11, wherein the identification module selects the subset of the restricted mobile applications from the mobile device manager list by receiving a user selection of the restricted mobile applications from the mobile device manager list.

14. The system of claim 10, wherein the series of device inputs for accessing the application entry points comprises one or more user clicks in a user interface notification window generated by the restricted mobile applications.

15. The system of claim 10, wherein the series of device inputs for accessing the application entry points comprises one or more user clicks to access a shortcut menu listing actions for performing functions associated with the restricted mobile applications.

16. The system of claim 10, wherein the authentication module requests the authentication credentials for bypassing the access restriction to the mobile applications by:

identifying an authentication method associated with the mobile applications for receiving the authentication credentials; and requesting the authentication credentials based on the authentication method.

17. The system of claim 10, wherein the security module performs the security action that protects against potentially malicious activity associated with unauthorized access to the mobile applications by preventing execution of unauthorized application actions from the application entry points to the mobile applications.

18. A non-transitory computer-readable medium comprising one or more computer-executable instructions that, when executed by at least one processor of a computing device, cause the computing device to:

identify one or more mobile applications having an access restriction and a plurality of application entry points associated with at least one mobile application function;

intercept a series of device inputs from a user for accessing the application entry points to bypass the access restriction for the mobile applications, wherein the series of device inputs are intercepted by:

initiating a call to an application programming interface (API) in communication with an operating system running on the computing device; and generating, in response to the API call, a transparent window over a currently displayed user interface displayed by the computing device to capture the series of device inputs for accessing the application entry points from the user;

request authentication credentials to bypass the access restriction from the application entry points;

determine that the requested authentication credentials are invalid; and perform a security action that protects against potentially malicious activity associated with unauthorized access to the mobile applications upon determining that the requested authentication credentials are invalid.

19. The computer-implemented method of claim 6, wherein the shortcut menu listing the actions for performing the functions associated with the restricted mobile applications comprises at least one of:

a user option to read messages received by the restricted mobile applications; and another user option to reply to the messages received by the restricted mobile applications.

20. The system of claim 15, wherein the shortcut menu listing the actions for performing the functions associated with the restricted mobile applications comprises at least one of:

a user option to read messages received by the restricted mobile applications; and another user option to reply to the messages received by the restricted mobile applications.

* * * * *